United States Patent
Ellis et al.

(10) Patent No.: US 9,438,953 B2
(45) Date of Patent: Sep. 6, 2016

(54) PROGRAM GUIDE APPLICATION INTERFACE SYSTEM

(75) Inventors: Michael D. Ellis, Boulder, CO (US); Robert A. Knee, Lansdale, PA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 12/869,287

(22) Filed: Aug. 26, 2010

(65) Prior Publication Data

US 2011/0093894 A1 Apr. 21, 2011

Related U.S. Application Data

(63) Continuation of application No. 12/579,635, filed on Oct. 15, 2009, now Pat. No. 7,805,742, which is a continuation of application No. 10/684,326, filed on Oct. 10, 2003, now Pat. No. 7,624,410, which is a continuation of application No. 09/145,232, filed on Sep. 1, 1998, now Pat. No. 6,665,869.

(60) Provisional application No. 60/058,073, filed on Sep. 5, 1997.

(51) Int. Cl.
*G06F 3/00* (2006.01)
*G06F 13/00* (2006.01)
*H04N 5/445* (2011.01)
*H04N 21/45* (2011.01)
(Continued)

(52) U.S. Cl.
CPC ........ *H04N 21/4508* (2013.01); *H04N 5/4401* (2013.01); *H04N 5/44543* (2013.01); *H04N 5/44582* (2013.01); *H04N 5/772* (2013.01); *H04N 5/782* (2013.01); *H04N 7/17318* (2013.01); *H04N 21/4438* (2013.01); *H04N 21/4542* (2013.01); *H04N 21/472* (2013.01); *H04N 21/478* (2013.01); *H04N 21/482* (2013.01); *H04N 21/4828* (2013.01); *H04N 5/775* (2013.01); *H04N 5/7755* (2013.01)

(58) Field of Classification Search
None
See application file for complete search history.

(56) References Cited

U.S. PATENT DOCUMENTS 3,440,427 A 4/1969 Kammer
3,492,577 A 1/1970 Reiter et al.
(Continued)

FOREIGN PATENT DOCUMENTS

CA 2223057 6/1996
CA 2232003 10/1996
(Continued)

OTHER PUBLICATIONS

S. Hartwig, "Softwarearchitekturen für interaktive digitale Decoder," Fernseh-und Kino-Technik, 50(3):92-94, 96-98, 100-102 (1996).
(Continued)

*Primary Examiner* — Nasser Goodarzi
*Assistant Examiner* — Fred Peng
(74) *Attorney, Agent, or Firm* — Ropes & Gray LLP

(57) ABSTRACT

A program guide system is provided that supports a program guide application and multiple non-guide applications. The program guide system has a program guide application interface that allows the non-guide applications to use both device resources and program guide resources. The application interface maintains a list of registered applications and directs control requests from various applications to the current primary application. The application interface also has a user interface input director that directs keystrokes and other user input commands to the appropriate application. If a keystroke for the program guide application is detected while a non-guide application is running, the program guide application is invoked.

32 Claims, 9 Drawing Sheets

(51) Int. Cl.
*H04N 5/44* (2011.01)
*H04N 5/77* (2006.01)
*H04N 5/782* (2006.01)
*H04N 7/173* (2011.01)
*H04N 21/443* (2011.01)
*H04N 21/454* (2011.01)
*H04N 21/472* (2011.01)
*H04N 21/478* (2011.01)
*H04N 21/482* (2011.01)
*H04N 5/775* (2006.01)

(56) References Cited

U.S. PATENT DOCUMENTS

| | | |
|---|---|---|
| 3,493,674 A | 2/1970 | Houghton |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,162,516 A | 7/1979 | Becker |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,270,145 A | 5/1981 | Farina |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,337,480 A | 6/1982 | Bourassin et al. |
| 4,337,482 A | 6/1982 | Coutta |
| 4,337,483 A | 6/1982 | Guillou |
| 4,344,090 A | 8/1982 | Belisomi et al. |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,581 A | 1/1984 | Schweppe et al. |
| 4,429,385 A | 1/1984 | Cichelli et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Krüger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,523,228 A | 6/1985 | Banker |
| 4,533,910 A | 8/1985 | Sukonick et al. |
| 4,536,791 A | 8/1985 | Campbell et al. |
| 4,547,804 A | 10/1985 | Greenberg |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,620,229 A | 10/1986 | Amano et al. |
| 4,622,545 A | 11/1986 | Atkinson |
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,706,121 A | 11/1987 | Young |
| 4,712,105 A | 12/1987 | Kohler |
| RE32,632 E | 3/1988 | Atkinson |
| 4,748,618 A | 5/1988 | Brown et al. |
| 4,750,036 A | 6/1988 | Martinez |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,821,102 A | 4/1989 | Ichikawa et al. |
| 4,829,558 A | 5/1989 | Welsh |
| 4,847,604 A | 7/1989 | Doyle |
| 4,847,700 A | 7/1989 | Freeman |
| 4,862,268 A | 8/1989 | Campbell et al. |
| 4,873,623 A | 10/1989 | Lane et al. |
| 4,884,223 A | 11/1989 | Ingle et al. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,908,707 A | 3/1990 | Kinghorn |
| 4,908,713 A | 3/1990 | Levine |
| 4,914,517 A | 4/1990 | Duffield |
| 4,914,732 A | 4/1990 | Henderson et al. |
| 4,931,783 A | 6/1990 | Atkinson |
| 4,935,865 A | 6/1990 | Rowe et al. |
| 4,937,821 A | 6/1990 | Boulton |
| 4,939,507 A | 7/1990 | Beard et al. |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,995,078 A | 2/1991 | Monslow et al. |
| 5,008,853 A | 4/1991 | Bly et al. |
| 5,014,125 A | 5/1991 | Pocock et al. |
| 5,038,211 A | 8/1991 | Hallenbeck |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,103,314 A | 4/1992 | Keenan |
| 5,148,154 A | 9/1992 | MacKay et al. |
| 5,151,782 A | 9/1992 | Ferraro |
| 5,151,789 A | 9/1992 | Young |
| 5,155,806 A | 10/1992 | Hoeber et al. |
| 5,157,768 A | 10/1992 | Hoeber et al. |
| 5,177,604 A | 1/1993 | Martinez |
| 5,195,092 A | 3/1993 | Wilson et al. |
| 5,206,722 A | 4/1993 | Kwan |

(56) References Cited

U.S. PATENT DOCUMENTS

| | | | |
|---|---|---|---|
| 5,210,611 A | 5/1993 | Yee et al. | |
| 5,214,622 A | 5/1993 | Nemoto et al. | |
| 5,220,420 A | 6/1993 | Hoarty et al. | |
| 5,223,924 A | 6/1993 | Strubbe | |
| 5,231,493 A | 7/1993 | Apitz | |
| RE34,340 E | 8/1993 | Freeman | |
| 5,235,415 A | 8/1993 | Bonicel et al. | |
| 5,236,199 A | 8/1993 | Thompson, Jr. | |
| 5,237,411 A | 8/1993 | Fink et al. | |
| 5,237,417 A | 8/1993 | Hayashi et al. | |
| 5,239,540 A | 8/1993 | Rovira et al. | |
| 5,247,347 A | 9/1993 | Litteral et al. | |
| 5,247,364 A | 9/1993 | Banker et al. | |
| 5,253,066 A | 10/1993 | Vogel | |
| 5,253,067 A | 10/1993 | Chaney et al. | |
| 5,283,819 A | 2/1994 | Glick et al. | |
| 5,323,240 A | 6/1994 | Amano et al. | |
| 5,335,277 A | 8/1994 | Harvey et al. | |
| 5,353,121 A | 10/1994 | Young et al. | |
| 5,357,276 A | 10/1994 | Banker et al. | |
| 5,367,316 A | 11/1994 | Ikezaki | |
| 5,382,983 A | 1/1995 | Kwoh et al. | |
| 5,387,945 A | 2/1995 | Takeuchi | |
| 5,404,393 A | 4/1995 | Remillard | |
| 5,410,326 A | 4/1995 | Goldstein | |
| 5,477,262 A | 12/1995 | Banker et al. | |
| 5,479,268 A | 12/1995 | Young et al. | |
| 5,481,542 A | 1/1996 | Logston et al. | |
| 5,483,278 A | 1/1996 | Strubbe et al. | |
| 5,485,221 A | 1/1996 | Banker et al. | |
| 5,523,796 A | 6/1996 | Marshall et al. | |
| 5,528,304 A | 6/1996 | Cherrick et al. | |
| 5,532,754 A | 7/1996 | Young et al. | |
| 5,559,548 A | 9/1996 | Davis et al. | |
| 5,559,549 A | 9/1996 | Hendricks et al. | |
| 5,583,560 A | 12/1996 | Florin et al. | |
| 5,585,866 A | 12/1996 | Miller et al. | |
| 5,589,892 A | 12/1996 | Knee et al. | |
| 5,594,509 A | 1/1997 | Florin et al. | |
| 5,596,373 A | 1/1997 | White et al. | |
| 5,600,364 A | 2/1997 | Hendricks et al. | |
| 5,600,573 A | 2/1997 | Hendricks et al. | |
| 5,621,456 A | 4/1997 | Florin et al. | |
| 5,635,978 A | 6/1997 | Alten et al. | |
| 5,635,979 A | 6/1997 | Kostreski et al. | |
| 5,650,826 A | 7/1997 | Eitz | |
| 5,659,350 A | 8/1997 | Hendricks et al. | |
| 5,663,757 A | 9/1997 | Morales | |
| 5,677,708 A | 10/1997 | Matthews, III et al. | |
| 5,682,195 A | 10/1997 | Hendricks et al. | |
| 5,689,799 A | 11/1997 | Dougherty et al. | |
| 5,699,107 A | 12/1997 | Lawler et al. | |
| 5,734,853 A | 3/1998 | Hendricks et al. | |
| 5,740,549 A | 4/1998 | Reilly et al. | |
| 5,760,821 A | 6/1998 | Ellis et al. | |
| 5,771,064 A | 6/1998 | Lett | |
| 5,781,246 A | 7/1998 | Alten et al. | |
| 5,798,785 A | 8/1998 | Hendricks et al. | |
| 5,801,787 A | 9/1998 | Schein et al. | |
| 5,808,608 A | 9/1998 | Young et al. | |
| 5,835,843 A | 11/1998 | Haddad | |
| 5,848,352 A | 12/1998 | Dougherty et al. | |
| 5,850,218 A | 12/1998 | LaJoie et al. | |
| 5,874,985 A | 2/1999 | Matthews, III | |
| 5,897,623 A | 4/1999 | Fein et al. | |
| 5,907,323 A | 5/1999 | Lawler et al. | |
| 5,914,746 A | 6/1999 | Matthews, III et al. | |
| 5,940,073 A | 8/1999 | Klostermann | |
| 5,959,688 A | 9/1999 | Schein et al. | |
| 5,969,748 A | 10/1999 | Casement et al. | |
| 5,990,927 A | 11/1999 | Hendricks et al. | |
| 6,163,316 A | 12/2000 | Killian | |
| 6,172,677 B1 | 1/2001 | Stautner et al. | |
| 6,177,931 B1* | 1/2001 | Alexander et al. | 725/52 |
| 6,188,995 B1 | 2/2001 | Garst et al. | |
| 6,208,799 B1 | 3/2001 | Marsh et al. | |
| 6,209,025 B1 | 3/2001 | Bellamy | |
| 6,230,325 B1* | 5/2001 | Iinuma et al. | 725/110 |
| 6,240,555 B1 | 5/2001 | Shoff et al. | |
| 6,263,501 B1 | 7/2001 | Schein et al. | |
| 6,282,714 B1 | 8/2001 | Ghori et al. | |
| 6,313,851 B1 | 11/2001 | Matthews, III et al. | |
| 6,317,885 B1 | 11/2001 | Fries | |
| 6,388,714 B1* | 5/2002 | Schein et al. | 348/563 |
| 6,408,437 B1 | 6/2002 | Hendricks et al. | |
| 6,469,753 B1 | 10/2002 | Klosterman et al. | |
| 6,505,348 B1 | 1/2003 | Knowles et al. | |
| 6,510,557 B1 | 1/2003 | Thrift | |
| 6,600,503 B2 | 7/2003 | Stautner et al. | |
| 6,665,869 B1 | 12/2003 | Ellis et al. | |
| 6,668,278 B1 | 12/2003 | Yen et al. | |
| 6,717,590 B1 | 4/2004 | Sullivan | |
| 6,725,461 B1 | 4/2004 | Dougherty et al. | |
| 6,732,179 B1 | 5/2004 | Brown et al. | |
| 6,735,487 B1 | 5/2004 | Marshall et al. | |
| 6,772,433 B1 | 8/2004 | LaJoie et al. | |
| 6,863,522 B2 | 3/2005 | Boneberg et al. | |
| 6,978,473 B1 | 12/2005 | Nsonwu et al. | |
| 7,062,777 B2 | 6/2006 | Alba et al. | |
| 7,464,393 B2 | 12/2008 | Westlake et al. | |
| 7,546,621 B2 | 6/2009 | La Joie et al. | |
| 7,624,410 B2 | 11/2009 | Ellis et al. | |
| 7,805,742 B2 | 9/2010 | Ellis et al. | |
| 8,046,801 B2 | 10/2011 | Ellis et al. | |
| 8,255,952 B2 | 8/2012 | Boylan, III et al. | |
| 8,843,642 B2 | 9/2014 | Shen | |
| 8,843,963 B2 | 9/2014 | Boylan | |
| 8,973,056 B2 | 3/2015 | Ellis | |
| 2002/0059599 A1 | 5/2002 | Schein et al. | |
| 2002/0116712 A1 | 8/2002 | Schein et al. | |
| 2003/0009758 A1 | 1/2003 | Townsend et al. | |
| 2003/0035007 A1 | 2/2003 | Wugofski | |
| 2005/0044565 A1 | 2/2005 | Jerding et al. | |
| 2005/0177850 A1 | 8/2005 | Boylan, III | |
| 2005/0235319 A1 | 10/2005 | Carpenter et al. | |
| 2005/0283800 A1 | 12/2005 | Ellis et al. | |
| 2006/0157217 A1 | 7/2006 | Bassi | |
| 2008/0184301 A1 | 7/2008 | Boylan, III et al. | |
| 2008/0271159 A1* | 10/2008 | Brown et al. | 726/27 |
| 2009/0049483 A1* | 2/2009 | Townsend et al. | 725/60 |
| 2009/0241144 A1* | 9/2009 | LaJoie et al. | 725/40 |
| 2011/0099573 A1 | 4/2011 | Ellis et al. | |
| 2011/0209180 A1 | 8/2011 | Ellis et al. | |
| 2015/0012944 A1 | 1/2015 | Boylan | |

FOREIGN PATENT DOCUMENTS

| | | |
|---|---|---|
| CA | 2337464 | 2/2000 |
| DE | 29 18 846 | 11/1980 |
| DE | 3246225 A1 | 6/1984 |
| DE | 3337204 | 4/1985 |
| DE | 36 21 263 A1 | 1/1988 |
| EP | 0337336 A2 | 10/1989 |
| EP | 0 393 555 | 10/1990 |
| EP | 0396062 A2 | 11/1990 |
| EP | 0401930 | 12/1990 |
| EP | 0408892 A1 | 1/1991 |
| EP | 0420123 A2 | 4/1991 |
| EP | 0 477 754 A2 | 4/1992 |
| EP | 0477756 A2 | 4/1992 |
| EP | 0 492 853 A2 | 7/1992 |
| EP | 0532322 A2 | 3/1993 |
| EP | 0 572 090 | 12/1993 |
| EP | 0 575 956 A2 | 12/1993 |
| EP | 0746119 | 4/1996 |
| EP | 0721253 A2 | 7/1996 |
| EP | 0827340 A2 | 3/1998 |
| EP | 0854645 A2 | 7/1998 |
| EP | 1330125 | 7/2003 |
| EP | 2268019 | 12/2010 |
| FR | 2662895 A1 | 12/1991 |
| GB | 2034995 A | 6/1980 |
| GB | 2126002 A | 3/1984 |
| GB | 2185670 A | 7/1987 |

(56) References Cited

FOREIGN PATENT DOCUMENTS

| | | |
|---|---|---|
| GB | 2256546 A | 12/1992 |
| JP | 58137334 A | 8/1983 |
| JP | 58196738 A | 11/1983 |
| JP | 59141878 A | 8/1984 |
| JP | 61-74476 | 4/1986 |
| JP | 2-48879 | 2/1990 |
| JP | 61-50470 A | 5/1994 |
| JP | 6260384 A | 9/1994 |
| WO | WO-86/01962 | 3/1986 |
| WO | WO-88/04507 | 6/1988 |
| WO | WO-89/12370 | 12/1989 |
| WO | WO-90/01243 A1 | 2/1990 |
| WO | WO-90/15507 | 12/1990 |
| WO | WO-91/18476 A1 | 11/1991 |
| WO | WO-92/04801 | 3/1992 |
| WO | WO-9305452 A1 | 3/1993 |
| WO | WO-93/11638 | 6/1993 |
| WO | WO-93/11639 | 6/1993 |
| WO | WO 95/07003 | 3/1995 |
| WO | WO 95/32585 | 11/1995 |
| WO | WO 96/09721 | 3/1996 |
| WO | WO 96/34466 | 10/1996 |
| WO | WO 96/34467 | 10/1996 |
| WO | WO 96/34491 | 10/1996 |
| WO | WO 96/41471 | 12/1996 |
| WO | WO 96/41478 | 12/1996 |
| WO | WO-9641478 | 12/1996 |
| WO | WO 97/13368 | 4/1997 |
| WO | WO 97/18675 | 5/1997 |
| WO | WO-9720431 | 6/1997 |
| WO | WO 97/31480 | 8/1997 |
| WO | WO 97/42763 | 12/1997 |
| WO | WO 97/48230 | 12/1997 |
| WO | WO 97/49237 | 12/1997 |
| WO | WO 97/49242 | 12/1997 |
| WO | WO 98/06219 | 2/1998 |
| WO | WO 98/16028 | 4/1998 |
| WO | WO 98/17064 | 4/1998 |
| WO | WO-98/26584 | 6/1998 |
| WO | WO-9831114 | 7/1998 |
| WO | WO 99/13641 | 3/1999 |
| WO | WO-0005889 A1 | 2/2000 |
| WO | WO-00/28734 | 5/2000 |

OTHER PUBLICATIONS

"Set-Top Box Control Software: A Key Component in Digital Video," by Keith Rath et al., Philips J. Res. 50 (1996) pp. 185-189.
"Open TV: Betriebssystem fur interaktives Fernsehen," by G. Hirts et al., Fernseh-Und Kino-Technik, 50, Jahrgan Nr. Mar. 1996 (1996).
"STB operating systems gear up for flood of data services," by T. Williams, Computer Design, Feb. 1996, pp. 67-80.
Buehl, J., "Navigation Service Requirements for Advanced Television," printed from the Internet at http://www.pioneerdigital.com/papers/navig.htm on May 5, 1999.
Leftwich, Jim and Steve Schein. Appendix B: Starsight Interactive Television Guide, Phase III. Palo Alto: Apr. 11, 1997.
"A New Approach to Addressability," CableData product brochure, undated.
"Addressable Decoder with Downloadable Operation," Proceedings from the 42nd Annual Convention and Exposition of the NCTA, Jun. 6-9, 1993, pp. 82-89.
"Creation/Modification of the Audio Signal Processor Setup for a PC Audio Editor," IBM Technical Disclosure Bulletin, vol. 30, No. 10, Mar. 1988, pp. 367-376.
"D2B-Home Bus für Audio and Video," Selektor, No. 4, Apr. 1990, pp. 10, 12.
"Interactive Computer Conference Server," IBM Technical Disclosure Bulletin, vol. 34, No. 7A, Dec. 1991, pp. 375-377.
"Interface Device for Conventional TVs to Improve Functionality," IBM Technical Disclosure Bulleting, Vo. 36, No. 7, Jul. 1993, pp. 53-54.
"Learning Considerations in User Interface Design: The Room Model," Patrick P. Chan, publication of the Software Portability Laboradtory, University of Waterloo, Waterloo, Ontario, Canada, Jul. 1984.
"MSI Datacasting Systems," TV Communications Journal, Jan. 1973.
"The New Media and Broadcast Policy: An Investigation & Research Conference Report on Broadcasting Diversificiation," Japan Ministry of Posts & Telecommunications, Mar. 1982.
"Videotoken Network New Dimension Television" (Plaintiffs Exhibit 313).
"Westar and Videotoken Network Present the TableComputer" (Plaintiff's Exhibit 324).
Antonof, "Stay Tuned for Smart TV," Popular Science, Nov. 1990, pp. 62-65.
Author unknown, "Facsimile Transmission," NHK Research Monthly Report, Dec. 1987.
Baer, R.H., "Innovative Add-On TV Products," IEEE Transactions on Consumer Electronics, vol. CE-25, Nov. 1979, pp. 765-771.
Bensch, "VPV Videotext Programs Videorecorder," IEE Paper, Jun. 1988, pp. 788-792.
Bestler, "Flexible Data Structure and Interface Rituals for Rapid Development of OSD Applications," 42nd Annual Convention and Exposition of the NCTA, Jun. 6, 1993, San Francisco, CA, p. 223-236.
Brugliera, Vito,"Digital On-Screen Display—A New Technology for the Consumer Interface," Symposium Record Cable Sessions of the 18th International Television Symposium & Technical Exhibition, Jun. 1993, pp. 571-586.
Bureau of Science & Technology (Japan), "Computer Network: Current Status and Outlook on Leading Science and Technology," vol. 1, Dec. 1986.
CableComputer User's Guide, bearing a date of Dec. 1985 (Plaintiff's Exhibit 289).
CableComputer User's Guide, Rev. 1, Dec. 1985.
CableData, Roseville Consumer Presentation, Mar. 1986.
CableVision Advertisement for "TV Decisions," Aug. 1986.
Came, E.B., "The Wired Household," IEEE Spectrum, Oct. 1979, pp. 61-66.
Chirstodoulakis et al., "Browsing Within Time-Driven Multimedia Documents," publication of the Institute for Computer Research, University of Waterloo, Waterloo, Ontario, Canada, Jul. 1988, pp. 219-227.
Damouny, N.G., "Telextext Decoders—Keeping Up With the Latest Advances," IEEE Transactions on Consumer Electroncis, vol. CE-30, No. 3, Aug. 1984, pp. 429-435.
Edwardson et al., "CEEFAX: A Proposed New Broadcasting Ser.," Journal of the SMPTE, Jul. 1974, pp. 14-19.
Hedger, J., "Telesoftware: Home Computing Via Braodcast Teletext," IEEE Transactions on Consumer Electronics, vol. CE-25, No. 3, Jul. 1979, pp. 279-287.
Hirodata et al., "Impact: An Interactive Natural-Motion-Picture Dedicated Multimedia Authoring System," Communications of the ACM, Mar. 1991, pp. 343-350.
Hiroshi Ishii et al., "Clearface: Translucent Multiuser Interface fo TeamWorkStation," ECSCW, Sep. 1991, pp. 6-10.
Hiroshi Ishii et al., "Toward an Open Shared Workspace: Computer and Video Fusion Approach of TeamWorkStation," Communications of the ACM, Vo. 34, No. 12, Dec. 1991, pp. 37-50.
James, A., "Oracle—Broadcasting the Written Word," Wireless World, Jul. 1973, pp. 314-316.
Japan Mechanical Engineering Organization Int'l Society for the Advancement of Image Software, "Technological Examination & Basic Investigative Research Report on Image Databases," Japan, Mar. 1988.
Jerrold Communications Publication, "Cable Television Equipment," dated 1992 and 1993, pp. 8-2.1 to 8-6 and 8-14.1 to 8-14.3.
Joseph Roizen, "Teletext in the USA," Society of Motion Picture and Television Engineers Journal, Jul. 1981, pp. 602-610.
Judice, C.N., "Move Over Cable, Here Comes Video Via Voice Lines," Network World, Sep. 1986, p. 26.

(56) References Cited

OTHER PUBLICATIONS

Karstad, K., "Microprocessor Control for Color-TV Receivers," IEEE Transactions on Consumer Electronics, vol. CE-26, May 1980, pp. 149-155.
Lowenstein et al., "Technology Review," vol. 88, Oct. 1985, p. 22.
M/A-COM, Inc., Videocipher II Satellite Descrambler Owner's Manual, dated prior to Feb. 1986.
Mannes, G., "Smart Screens; Development of Personal Navigation Systems for TV Viewers," Video Magazine, Dec. 1993.
McKenzie, G.A., "Oracle—An Information Broadcasting Service Using Data Transmission in the Vertical Interval," Journal of the SMPTE, Jan. 1974, pp. 6-10.
Merrell, "Tac Timer," 1986 NCTA Technical Papers, pp. 203-206.
Michael Alexander, "Visualizing cleared-off desktops," Computerworld, May 6, 1991, p. 20.
*Preview Guide Brochure*, Spring 1994.
Rayers, D.J., "Telesoftware by Teletext," 1984 IEEE Conf. Papers, vol. 240, p. 323.
Schlender, "Couch Potatoes! Now It's Smart TV," Fortune, No. 20, 1989, pp. 111-116.
Sealfon, Peggy, "High Tech TV," Photographic, Dec. 1984.
Starsight CB1500 customer letter, "Getting Started" Installation Guide, "Using Starsight" Manual, and Remote Control "Quick Refernce Guide," 1994.
Starsight Interactive Television Guide, Phase III, Palo Alto. Apr. 11, 1997.
Sunada et al., "Teletext Color Television Receiver Model C-29M950, C26M940," NEC Home Electroncis, NEC Giho, 1987.
*Transcript of the Deposition of John Roop*, Oct. 1996, pp. 186-187.
Trial Testimony of Mr. Michael F. Axford, Reporter's Transcript of Proceedings Held on May 9, 1998 for *Prevue Interactive, Inc. and United Video Satellite Group, Inc.* vs. *Starsight Telesight, Inc.*, pp. 186-187, 296-315, and 352-357.
Various publications of Insight Telecast, 1992 and 1993.
Veith, R.H., "Television's Teletext," Elsevier Science Publishing Co., Inc., 1983, pp. 13-20, 41-51.
Videotext Programmiert Videorecorder, Rundfunktech Mitteilungen, Broadcast Engineering Reports, vol. 26, Nov.-Dec. 1982.
W. Leo Hoarty, "Multimedia on Cable Television Systems," 18th Intenational Television Sumposum and Technical Exhibition, Montreux, Switzerland, May 10, 1993, pp. 555-567.
Case 4:11-cv-06591-PJH, Complaint for Declaratory Relief (plaintiff), dated Dec. 21, 2011, 16 pages.
Davis, TV Guide on Screen, Violence on Television, House of Representatives, Committee on Energy and Commerce, Subcommittee on Telecommunications and Finance, pp. 93-163, Jun. 25, 1993.
Dinwiddie et al., Combined-User Interface for Computers, Television, Video Recorders, and Telephone, etc., IBM Technical Disclosure Bulletin, vol. 33, No. 3B, Aug. 1990, pp. 116-118.
Hitachi Consumer Electronics Co., Ltd., Certification of market introduction in 1993 of Hitachi Projection TV Model 55EX7K.
Hitachi Service Manual, No. 0021, Projection Color Television, Models 55EX7K, 50EX6K, 50ES1B/K, 46EX3B/4K, and 46EX3BS/4KS, Aug. 1993.
Hoarty, W. Leo, Multimedia on Cable Television Systems, Symposium Record Cable TV Sessions, 18th International Television Symposium and Technical Exhibition, Montreux, Switzerland, Jun. 10-15, 1993, pp. 555-567.
JVC Service Manual, 27" Color Monitor/Receiver, Model AV-2771S (U.S.), Jul. 1991.
Roizen, Joseph, Teletext in the USA, Society of Motion Picture and Television Engineers Journal, Jul. 1981, pp. 602-610.
Tech Notes: Product Updates from M/A-COM Cable Home Group, Videocipher Owner's Manual Update, Issue No. 6, Feb. 1986.
Uniden, UST-4800 Super, Integrated Receiver/Descrambler, Preliminary Reference Manual, Nov. 12, 1991, 80 pages.
Uniden, UST-4800, Integrated Receiver/Descrambler, Installation Guide, © 1990, Uniden America Corporation, 60 pages.
VTN Videotoken Network, New Dimension Television, Rev. 1, Dec. 1985.

* cited by examiner

PROGRAM GUIDE APPLICATION INTERFACE SYSTEM

This application is a continuation of pending U.S. patent application Ser. No. 12/579,635, filed Oct. 15, 2009, which is a continuation of U.S. patent application Ser. No. 10/684, 326, filed Oct. 10, 2003, now U.S. Pat. No. 7,624,410, which is a continuation of U.S. patent application Ser. No. 09/145, 232, filed Sep. 1, 1998, now U.S. Pat. No. 6,665,869, which claims the benefit of U.S. provisional patent application No. 60/058,073, filed Sep. 5, 1997, all of which are hereby incorporated by reference herein in their entireties.

BACKGROUND OF THE INVENTION

This invention relates to systems that support an interactive television program guide application and non-guide applications. More particularly, the invention relates to systems in which non-guide applications can use both device resources and program guide resources.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to access television program listings in different display formats. For example, a user may desire to view a grid of program listings organized in a channel-ordered list. Alternatively, the user may desire to view program listings organized by time, by theme (movies, sports, etc.), or by title (i.e., alphabetically ordered).

A user may also select a program for viewing or recording from the program guide. For example, the user may place a highlight region on top of a desired program listing and press a "record" button on a remote control. Pay programs may be ordered by placing the highlight region on a pay program listing and pressing an "order" button. Some program guides allow parents to block certain television programs based on criteria such as ratings information.

It would be desirable if the set-top box on which the interactive program guide is implemented could be used to support other applications in addition to the program guide application. For example, the user of the set-top box might wish to use the set-top box to implement an Internet browser application, a video-on-demand application, an interactive promotional channel application, a shopping application, etc. However, previously known program guide systems have generally been designed to run only one application at a time. With these systems the currently running application typically has exclusive control of set-top box resources such the on-screen display, tuner, remote control interface, light-emitting diodes, communications channels, etc. This may lead to conflicts. For example, if a non-guide application is running when the program guide application would normally have issued a reminder (e.g., for an upcoming television event), the user may not be able to receive the reminder. Moreover, the relatively high-level resources of the program guide application (such as parental control, program guide database access functions, etc.) have been unavailable to non-guide applications.

It is therefore an object of the present invention to provide an interactive television program guide system in which a program guide application and other applications may be implemented on the same set-top box and in which non-guide applications may use program guide resources.

SUMMARY OF THE INVENTION

This and other objects of the invention are accomplished in accordance with the principles of the present invention by providing an interactive program guide system which supports a program guide application and multiple non-guide applications. The system may be implemented on a set-top box or a comparable hardware platform. The program guide application runs on the set-top box to provide an interactive display of television program listings. A user may use the program guide to search for listings based on keywords, to order pay programs, to select a television program for recording, etc. The non-guide applications that run on the set-top box may include applications such as an Internet browser application, a video-on-demand application, an interactive promotional channel application, a shopping application, an electronic mail application, an audio-on-demand application, a banking application, a data services application, a wagering application, etc.

The applications use set-top box resources such as a display resource, a user input interface resource, a tuner resource, a communications circuitry resource, a memory resource, etc. The program guide application has program guide resources such as a parental control resource, a graphics library resource, a pay program purchasing resource, a program guide database access resource, a scheduling resource, a tuning resource, a menu resource, etc. The program guide resources are higher level resources than the device resources and are provided as part of the program guide. A program guide application interface allows the non-guide applications to use both the device resources and the program guide resources.

In addition, the program guide application interface allows applications to register and maintains a list of such registered applications. A control request processor within the program guide application interface directs control requests and suspend requests from the applications to the primary application that is running on the set-top box. The primary application processes the control requests and suspend requests and determines whether to relinquish control to a requesting application or whether to suspend operation of the primary application.

The program guide application interface intercepts keystrokes and other user input and determines to which application such user input should be sent. During registration, applications may provide the program guide application interface with key lists that identify the keys that application desires to use when it is the active application and when it is a background application.

The program guide application interface resolves conflicts between various applications as the applications contend for shared resources. For example, the application interface may coordinate requests from different applications to use the same key or to simultaneously use the display. In resolving such conflicts, the application interface may take account of which resources may not be shared, which resources may be shared without restriction, and which resources may be shared only with the guidance of the application interface.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
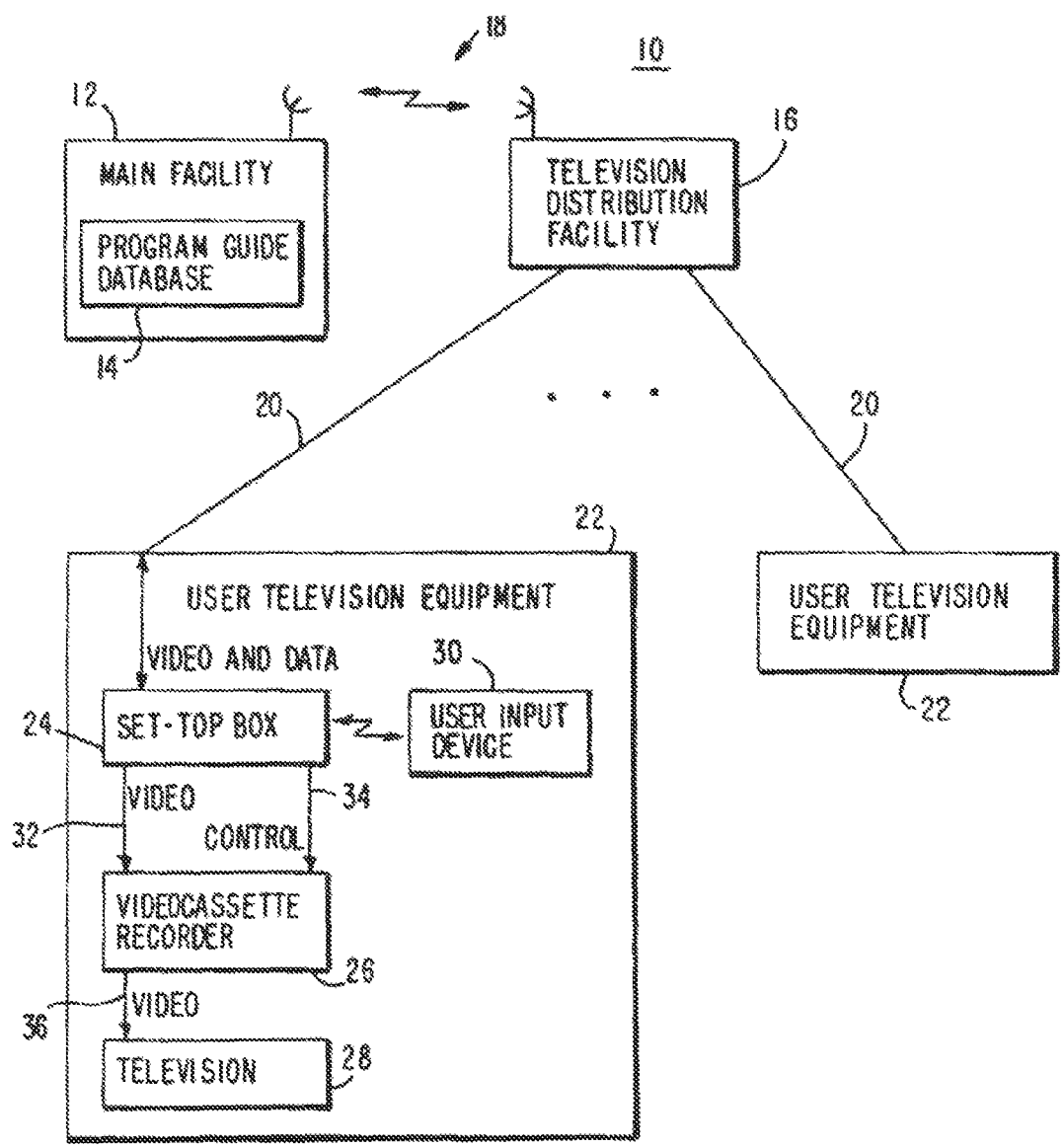
FIG. 1 is a schematic diagram of a system in accordance with the present invention.

An illustrative program guide system 10 in accordance with the present invention is shown in FIG. 1. Main facility 12 provides data from program guide database 14 to television distribution facility 16 via communications link 18. Link 18 may be a satellite link, a telephone network link, a cable or fiber optic link, a microwave link, a combination such links, or any other suitable communications path. Television distribution facility 16 may be a cable system headend, a broadcast distribution facility, or a satellite television distribution facility. If desired, television distribution facility 16 may have the capability to support (either alone or in combination with additional facilities) services such as Internet access, home shopping, video-on-demand services, electronic mail applications, audio-on-demand applications, banking applications, data services applications, wagering applications, etc. For example, if video-on-demand services are desired, television distribution facility 16 may contain a video or audio server. If home shopping services are to be provided, television distribution facility 16 may contain a home shopping database or may support communications to a home shopping service provider. Internet access may be provided by a server within television distribution facility 16 or may be provided by facilitating communications with a separate Internet service provider. Banking, wagering, and data services may be provided using facilities separate from television distribution facility 16. If desired, such separate facilities may be accessed through television distribution facility 16.

The data transmitted by main facility 12 to television distribution facility 16 includes television program guide data such as program times, channels, titles, descriptions and other program listings information, and pay program pricing information, copy protection information, etc. If desired, some data may be provided using data sources at facilities other than main facility 12. For example, data for supporting a home shopping application may be provided using a separate data facility (not shown).

Television distribution facility 16 distributes the program guide data and data for other services to multiple users via communications paths 20. Program guide data may be distributed periodically (e.g., once per hour or once each week). Each user has user television equipment 22. User television equipment 22 typically contains a set-top box 24, a videocassette recorder 26, and a television 28. Set-top box 24 may be controlled by a user input device 30 such as a remote control, wireless keyboard, mouse, trackball, etc.

Set-top box 24 contains a microprocessor and other circuitry for executing instructions to provide the features of the present invention. For example, an interactive television program guide may be implemented on set-top box 24 by executing a suitable program guide application. Other applications and a program guide application interface are also preferably implemented on set-top box 24. The applications and the program guide application interface may be implemented on user television equipment other than a set-top box if desired. However, the present invention will be illustrated with reference to a set-top box implementation for clarity.

Communications paths 20 preferably have sufficient bandwidth to allow television distribution facility 16 to distribute scheduled television programming, video-on-demand services, and other video information to user equipment 22 in addition to program guide data and data for other services. If desired, program guide data and data for other services may be distributed by one or more distribution facilities that are similar to but separate from television distribution facility 16 using communications paths that are separate from communications paths 20.

Certain functions such as pay program purchasing may require user equipment 22 to transmit data distribution facility 16 over communications paths 20. If desired, such data may be transmitted over telephone lines or other separate communications paths (not shown). Functions such as Internet services, home shopping services, etc. may also be provided using separate communications paths.

Multiple television channels (analog, digital, or both analog and digital) may be provided to set-top box 24 via communications path 20. During normal television viewing, the user tunes set-top box 24 to a desired one of these channels. The signal for that television channel may then be provided at video output 32 as a radio-frequency (RF) signal on a predefined channel (e.g., channel 3 or 4) or as a demodulated video signal. The video signal at output 32 is received by videocassette recorder 26, so that the user may record programs. Program recording and other features may be controlled by set-top box 24 using control path 34. A typical control path 34 involves the use of an infrared transmitter coupled to the infrared receiver in videocassette recorder 26 that normally accepts commands from a remote control. Such a remote control or other suitable user input device 30 may be used to control set-top box 24, videocassette recorder 26, and television 28.

Television 28 may receive RF or demodulated video signals from videocassette recorder 26 via path 36. The video signals on path 36 may either be generated by videocassette recorder 26 when playing back a prerecorded videocassette or may by passed through from set-top box 24. The video signals provided to television 28 may be real-time video signals such as a broadcast television program, a video-on-demand program, or video for a service with a real-time video component such as a promotional channel or home shopping service. The video signals may also contain information such as graphics and text to be displayed in addition to or in place of such real-time videos.

Figure 2:
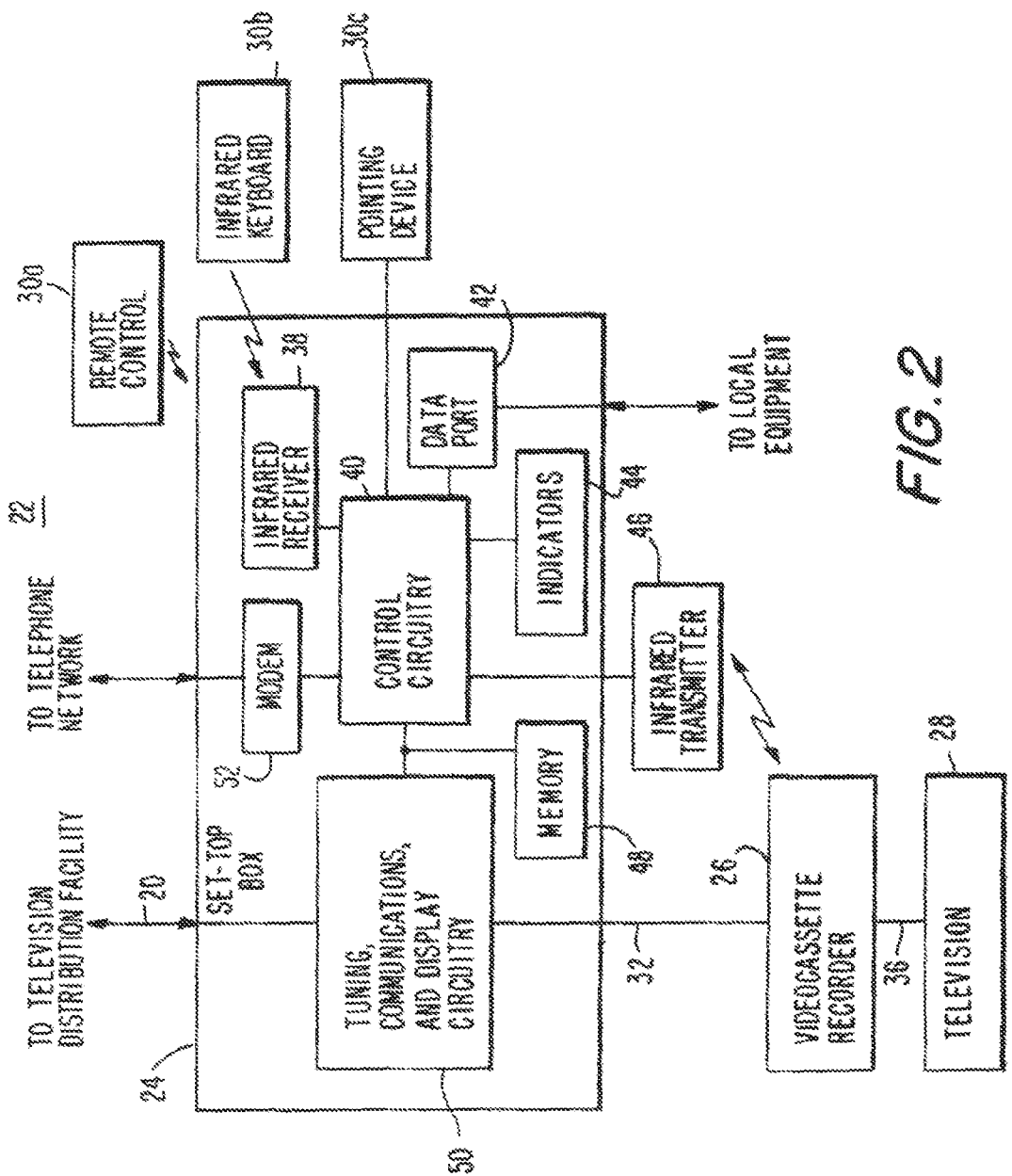
FIG. 2 is a schematic diagram of illustrative user television equipment in accordance with the present invention.

As shown in FIG. 2, multiple input devices may be used with set-top box 24. For example, infrared remote control 30a may be used to control the interactive program guide. Infrared keyboard 30b may be used when browsing the Internet or to enter information for the program guide. Pointing device 30c, which may be a mouse, trackball, touch-pad or other suitable pointing device, may be used when browsing the Internet. Signals from infrared devices may be received with infrared receiver 38. Other user input devices may be coupled more directly to control circuitry 40. The input devices shown in FIG. 2 are illustrative. Any suitable type of input device may be used, including infrared pointing devices, other types of wireless devices, hardwired remotes or keyboards, voice-recognition devices, etc.

Set-top box 24 may contain one or more data ports such as data port 42 for interfacing with local equipment such as a personal computer, printer or the like. Data port 42 may be compatible with any suitable communications protocol, such the IEEE 1394 bus standard, the RS-232 bus standard, or the USB (Universal Serial Bus) standard.

Indicators 44 may be used to display certain information directly on set-top box 24. For example, numeric indicators may be used to display the current channel to which set-top box 24 is tuned. Dedicated single-element indicators may be used to indicate that the power in the system is on or that a message has been received, etc.

Infrared transmitter 46 may be used to transmit control commands to the infrared receiver in videocassette recorder 26 (e.g., to direct videocassette recorder 26 to turn on and to record a television program that the user has selected from the program guide).

Memory 48 may be used to store data and instructions for execution by a microprocessor contained in control circuitry 40.

Set-top box 24 also contains tuning, communications, and display circuitry 50. Circuitry 50 handles tuning functions such as receiving and demodulating analog and digital video and audio streams. Circuitry 50 may also descramble pay channels and video-on-demand channels. If a program is copy protected and set-top box 24 receives proper authorization, circuitry 50 can remove the copy protection. Parents may lock certain programs so that they cannot be viewed by children. Circuitry 50 may block programs that have been locked by distorting the video and audio supplied at output 32 or by preventing children from tuning to the blocked programs.

Circuitry 50 also handles various communications functions. For example, downstream data such as program guide data from television distribution facility 16 (FIG. 1) may be supplied to set-top box 24 over an in-band, out-of-band, or vertical blanking interval link in communications path 20. Circuitry 50 provides such downstream data to control circuitry 40. Circuitry 50 also handles upstream data such as pay program purchasing information that is supplied to television distribution facility 16 (FIG. 1) over communications path 20. Additional communications functions may be provided using modem 52, which may be linked to television distribution facility 16 (FIG. 1) and other suitable data distribution and service provider facilities via the telephone network. If desired, a cable modem or other high-speed data communications device may be used for certain types of communications.

Circuitry 50 preferably allows various images to be displayed on television 28 via output 32 and path 36. Displayed images may include graphics, text, animations, etc. Images may be displayed in place of video information or may be displayed at the same time as video information (e.g., by using circuitry 50 as an image overlayer). Examples of images that may be displayed include program listings grids, web pages, product lists, promotional information, etc.

Figure 3:
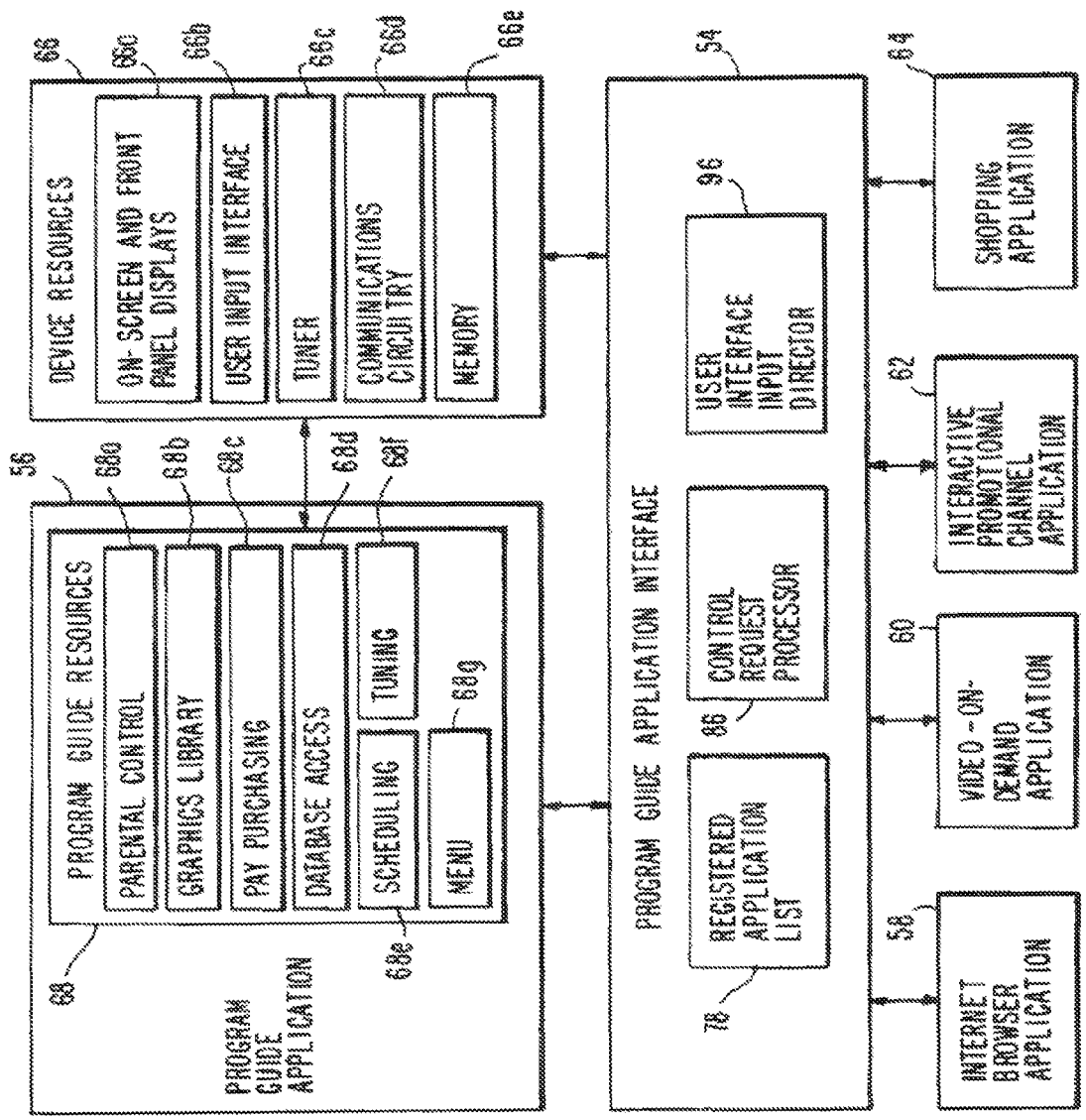
FIG. 3 is a schematic diagram showing the relationship between a program guide application interface, program guide application, non-guide applications, and various device resources in accordance with the present invention.

FIG. 3 shows how the system of the present invention has a program guide application interface 54 that supports a program guide application 56 and one or more non-guide applications such as Internet browser application 58, video-on-demand application 60, interactive promotional channel application 62, and shopping application 64. Other non-guide applications that may be supported include electronic mail applications, audio-on-demand applications, banking applications, data services applications, wagering applications, etc. Program guide application interface 54 may be part of program guide application 56 or may be separate, as shown in FIG. 3. Program guide application 56 provides the features of an interactive program guide using program guide resources 68. For example, program guide application 68 may obtain program listings data previously stored in memory using database access resource 68d. Program listings data may be displayed using various templates and display functions of graphics library resource 68b. Pay programs may be purchased using pay purchasing resource 68c. Program guide application 56 allows parents to lock programs using parental control resource 68a. Programs may be scheduled for recording and reminders for certain programs may be set using scheduling resource 68e. Tuning resource 68f may be used to ensure that the channels to which the program guide or other application that uses resource 68f tune satisfy predefined parental control criteria (using resource 68c) and are displayed properly on the viewer's display screen (e.g., as a flip or browse display). Tuning resource 68f may also be used to control the front-panel light-emitting diodes (LEDs) or other such display that is used to display channel numbers and the like. Menu resource 68g may be used to display various items on program guide menu display screens. Other illustrative program guide resources may be used to descramble certain programs, to receive and display e-mail, etc.

Program guide application interface 54 allows non-guide applications such as non-guide applications 58, 60, 62, and 64 to use program guide resources 68 or to use device, resources 66 directly. For example, video-on-demand application 60 may display a list of program titles on television 28 (FIG. 2) using on-screen and front panel display resources 66a (i.e., the display circuitry portion of circuitry 50 of FIG. 2 and any associated set-top box software that drives indicators 44 and television 28). Video-on-demand application 60 may also display a list of program titles on television 28 using program guide graphics library resource 68b. Program guide graphics library resource 68b preferably supports functions for drawing the types of displays used in program guides. Typical graphics library functions include functions for generating lists of television program titles, program listings grids or tables, pay program ordering screens, menus, etc.

Using graphics library resource 68b involves the use of display resource 66a because implementing the functions of graphics library resource 68b involves the use of the circuitry of display resource 66a. Nevertheless, using the functions of graphics library resource 68b rather than using display resource 66a directly conserves resources, because the functions provided by graphics library resource 68b do not need to be duplicated by video-on-demand application 60.

Another program guide resource that video-on-demand application 60 may use is database access resource 68d. Database access resource 68d is a program guide resource that allows program guide application 56 to access program data (e.g., program titles, times, channels, ratings, summary information, etc.) that has been stored in memory. Although such data might be retrieved directly from memory using memory resource 66e, the database management functions of database access resource 68d help facilitate the orderly storage and retrieval of program data in memory. As a result, it is more efficient for video-on-demand application 60 to use database access resource 68d than to duplicate such functions within video-on-demand application 60.

Some of the functions of video-on-demand application 60 may be best provided using device resources 66. For example, when a user places an order for a video, the order may be transmitted via an upstream data path to a video server in television distribution facility 16. Such upstream transmissions can be accomplished using communications circuitry resource 66d.

Another illustrative example involves Internet browser application 58, which primarily relies on direct use of device resources 66. Display functions may be provided using display resource 66a. Internet communications functions may be provided using communications circuitry resource 66d (e.g., modem 52 of FIG. 2 and its associated software). Memory resource 66e may be used directly, because database access resource 68d is not required for Internet browsing. Internet browser application 58 can also use the user input interface resource 66b to support pointing device 30c (FIG. 2). If desired, a message light (one of indicators 44 of FIG. 2) may be turned on by Internet browser application 58 whenever Internet e-mail is received. Supporting this function may involve direct use of display resource 66a.

Interactive promotional channel application 62 uses different resources. For example, interactive promotional channel application 62 may not use the message light function of display resource 66a. Interactive promotional channel application 62 may support use of a remote control (user input interface resource 66b). Tuner resource 66c may be used to tune to an appropriate promotional channel from among the various channels of video provided to set-top box 24 via path 20 (FIG. 2). Program guide resources 68 that may be used by interactive promotional channel application 62 include pay purchasing resource 68c, database access resource 68d, and graphics library resource 68b. Pay purchasing resource 68c handles purchasing functions such as entering personal identification numbers (PIN), confirming purchases, and issuing reminders when programs are about to begin. Database access resource 68d handles functions such as accessing titles, broadcast times and program summaries. Graphics library resource 68b may be used to display banners and templates for program titles and program summary information.

Shopping channel application 64 may use graphics library resource 68b to display product lists. Communications circuitry resource 66d may be used to transmit product orders to an order processing facility. Various input devices may be supported using user input interface resource 66b, such as remote control 30a, keyboard 30b, and pointing device 30c.

These examples are illustrative only. Various other suitable applications may be used and such applications may use any suitable combinations of functions provided by program guide resources 68 and device resources 66.

Figure 4A:
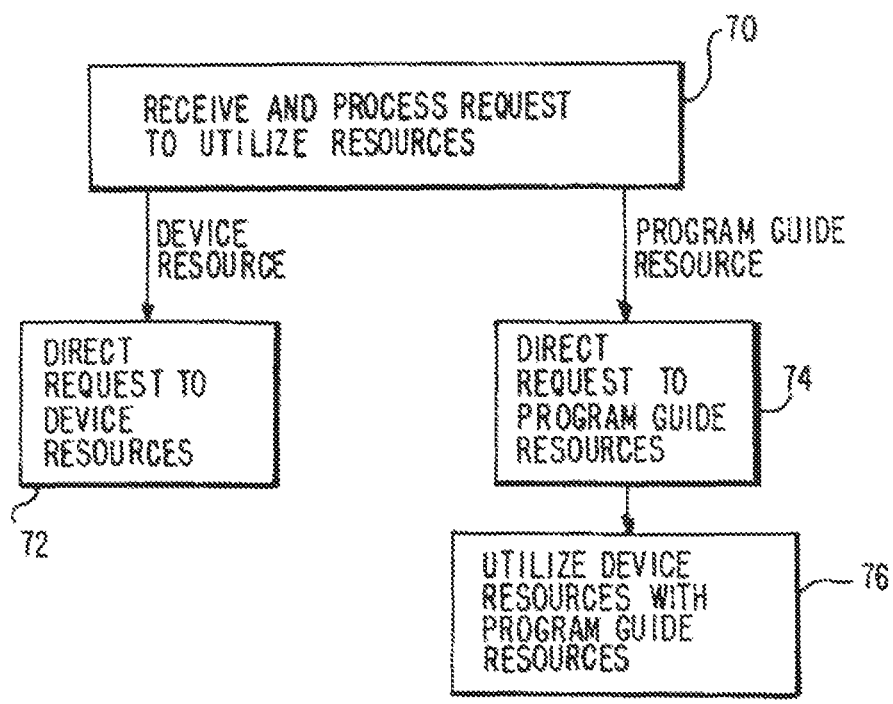
FIG. 4a is a flow chart of illustrative steps involved in processing requests to use resources with the program guide application interface in accordance with the present invention.

The process by which program guide application interface 54 handles requests from the non-guide application's to use program guide resources 68 and device resources 66 is shown in FIG. 4a. At step 70, program guide application interface 54 receives and processes requests from applications to use resources (e.g., to use graphics library 68b or display 66a). If a request is made to use one of device resources 66, program guide application interface 54 directs the request to device resources 66 at step 72, so that the requesting application may use the requested device resource 66. If a request is made to use one of program guide resources 68, program guide application interface 54 directs the request to program guide resources 68 at step 74. At step 76, the requesting application uses the device resources 66 that are involved in the use of the requested program guide resources 68 (e.g., the requesting application uses display 66a if a request was made to use graphics library 68b, which relies upon the use of display 66a).

Figure 4B:
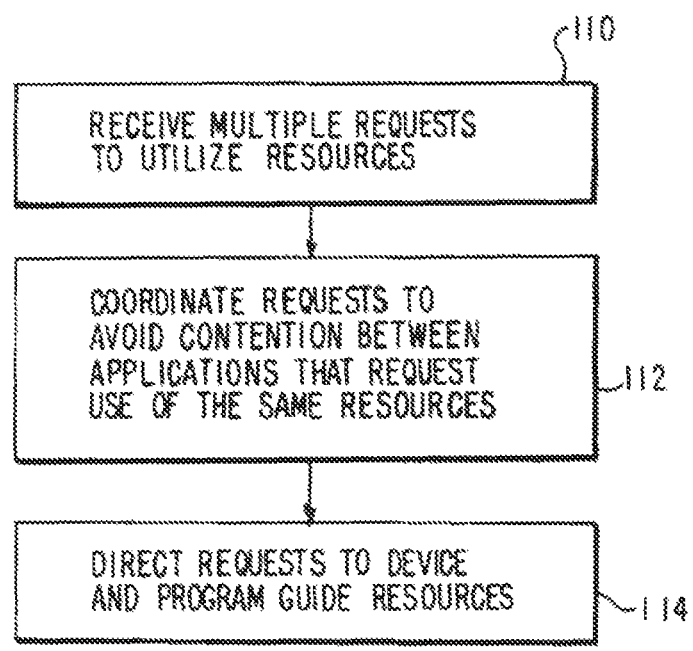
FIG. 4b is a flow chart of illustrative steps involved in processing multiple requests to utilize resources with the program guide application interface in accordance with the present invention.

When more than one application makes resource requests (for device and/or program guide resources) at the same time, the program guide application interface coordinates the multiple requests so as to avoid contention between applications for the same resources, as shown in FIG. 4b. At step 110, the program guide application interface receives multiple requests from different applications. For example, the program guide application interface may receive simultaneous requests to use display resource 66a from a home shopping application and from the program guide. At step 112, the program guide application interface coordinates the requests thereby resolving the conflicts between the various requesting applications. Any suitable technique may be used to resolve conflicts. For example, the program guide application interface may always favor the program guide over non-program guide applications. Another technique involves weighing the importance of the various requests. With this approach, each application may attach a weight to its requests indicating how urgently the requested resource is needed. Yet another technique for resolving conflicts between multiple applications that request resources at the same time involves using lists that set forth the resource requirements of the applications. For example, each application may submit to the application interface a predefined list of which keys (part of user input interface resource 66b) are desired when that application is active (i.e., an active key list) and a list of which keys are desired when the application is running in the background (i.e., a background key list). The application interface may take the contents of such lists into account when deciding how to resolve a conflict between two applications that are requesting use of the same remote control key or any other shared resource. In resolving conflicts, the application interface may take into account that certain resources may be shared, some resources may not be shared, and other resources may be shared, but only through the intervention of the application interface. An example of a resource that may be shared through the intervention of the application interface are the front-panel set-top box light-emitting diodes. At step 114, the program guide application interface directs resource requests to the device and program guide resources.

In order to facilitate operation of the system of the present invention with multiple applications, program guide application interface 54 maintains a registered application list 78 (FIG. 3) that allows interface 54 to keep track of which applications are loaded in set-top box 24 (FIG. 2) and how to communicate with them.

The process by which program guide application interface 54 maintains registered application list 78 is shown in FIG.

5. An application registers by supplying a communications address and an identifier to program guide application interface 54. The communications address and identifier are received by program guide application interface 54 at steps 80 and 82. At step 84, program guide application interface 54 updates registered application list 78 of FIG. 3 accordingly. At a later time, a registered application may be unregistered (step 85).

The communications addresses in list 78 are used by program guide application interface 54 in sending messages (data or commands) to the various registered applications. Messages from the applications to program guide application interface 54 are tagged with appropriate identifiers. Program guide application interface 54 may identify which application provided a given message by comparing the identifier accompanying the received message to the identifiers in list 78.

Another function of program guide application interface 54 involves processing control requests from various applications (including the program guide application). For example, video-on-demand application 60 may request control in order to turn on a message light or to display a message informing the user that the desired video selection is about to be delivered. If another application (e.g., shopping application 64) currently has primary control of set-top box 24 (FIG. 1), program guide application interface 54 transfers the control request from video-on-demand application 60 to shopping application 64, which may then decide whether to relinquish control.

Figure 6A:
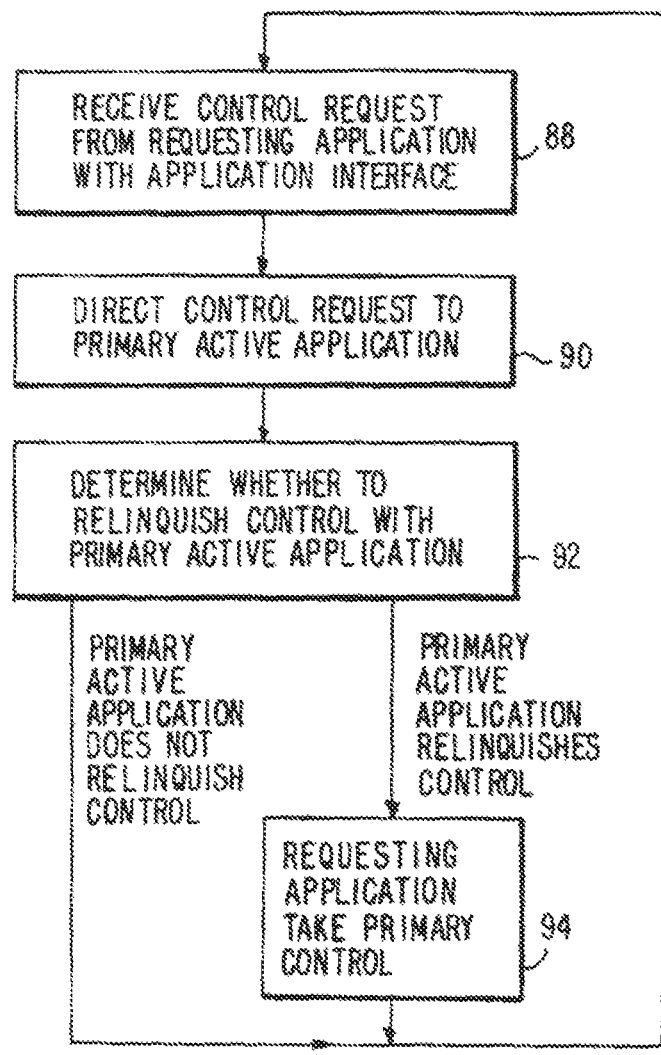
FIG. 6a is a flow chart of illustrative steps involved in processing control requests with the program guide application interface in accordance with the present invention.

Program guide application interface 54 contains control request processor 86 for handling control requests. Steps involved in processing control requests with control request processor 86 are shown in FIG. 6a. At step 88, control request processor 86 of program guide application interface 54 receives a control request from a requesting application (e.g., video-on-demand application 60). At step 90, control request processor 86 determines which application is the current primary application and directs the control request to that application. At step 92, the primary application (e.g., shopping application 64) determines whether to relinquish control based on preset or dynamic priorities. If the primary application does not relinquish control to the requesting application at step 92, control returns to step 88. If the primary application does relinquish control at step 92, the requesting application takes primary control of the operation of set-top box 24 (FIG. 1) at step 94.

The operation of control request processor 86 that is shown FIG. 6a is illustrative only. Other suitable arrangements for handling control requests may be used. For example, program guide application interface 54 may handle the determination of which application should maintain primary control of the system rather than the primary application.

Figure 6B:
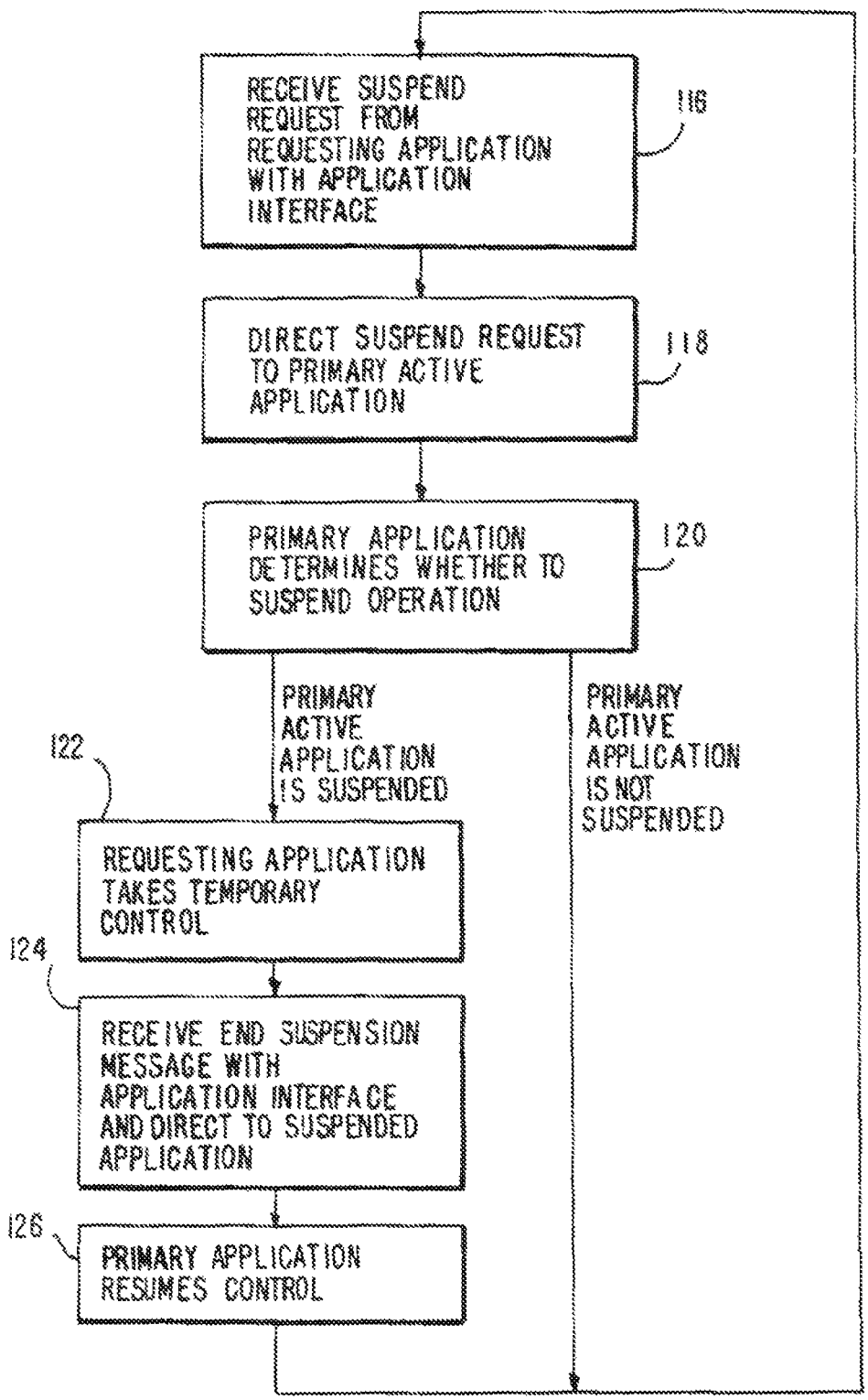
FIG. 6b is a flow chart of illustrative steps involved in processing suspend operation requests with the program guide application interface in accordance with the present invention.

As shown in FIG. 6b, control request processor 86 may also handle requests to suspend the operation of the primary application, rather than simply to terminate its operation. At step 116, control request processor 86 of program guide application interface 54 receives a suspend request from a requesting application (e.g., video-on-demand application 60). At step 118, control request processor 86 determines which application is the current primary application and directs the suspend request to that application. At step 120, the primary application (e.g., shopping application 64) determines whether to suspend its operation based on preset or dynamic priorities. If the primary application does not suspend its operation at step 120, control returns to step 116. If the primary application does suspend its operation at step 120, the requesting application takes temporary control of the operation of set-top box 24 (FIG. 1) at step 122. The suspension of operation of the primary application may be terminated by a control request directing the requesting application that is in temporary control to relinquish control. Alternatively, at step 124 the program guide application interface may receive an end suspension message and may direct the end suspension message to the primary application whose operation is being temporarily suspended. The primary application may then resume control at step 126. If desired, control request processor 86 may handle both control requests to relinquish control (as shown in FIG. 6a) and suspend operation requests to suspend operation (as shown in FIG. 6b).

Figure 5:
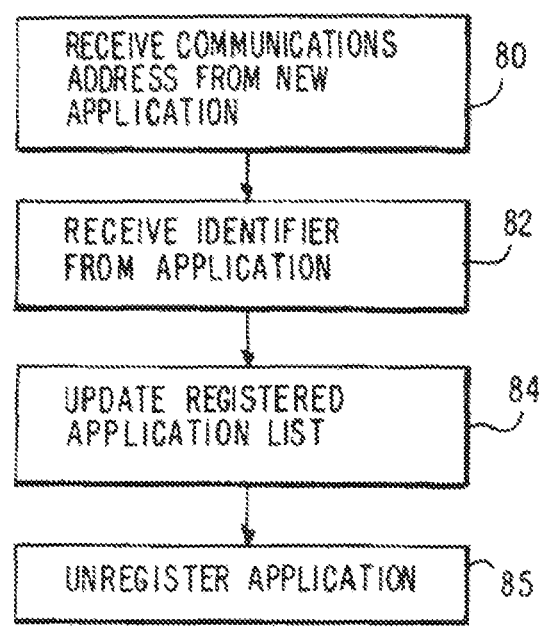
FIG. 5 is a flow chart of illustrative steps involved in registering applications with the program guide application interface and maintaining a list of registered applications in accordance with the present invention.
Figure 7:
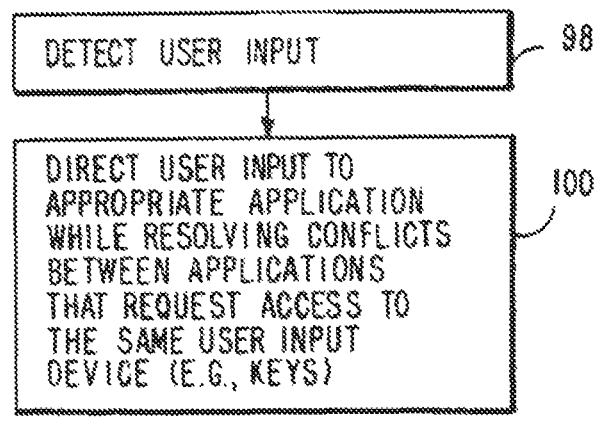
FIG. 7 is a flow chart of illustrative steps involved in directing user input to the appropriate application with the program guide application interface of the present invention.

Another function of program guide application interface 54 is to intercept input from the user interface (e.g., remote control 30a, infrared keyboard 30b, pointing device 30c, etc.) and to direct that input to the appropriate application running within set-top box 24. As shown in FIG. 3, program guide application interface 54 has user interface input director 96 for directing keystrokes, remote control button presses, mouse clicks, etc. to applications 56, 58, 60, 62, and 64. The operation of user interface input director 96 is shown in FIG. 7. At step 98, user interface input director 96 detects user input. At step 100, this user input is directed to the appropriate application while conflicts between applications are resolved. In order to resolve conflicts that may occur when multiple applications request access to the same user input device (e.g., remote control keys), each application may submit to the application interface a predefined list of which keys are desired when that application is active (an active key list) and a list of which keys are desired when the application is running in the background (a background key list). Applications may submit such key lists to the application interface at device registration (FIG. 5) or dynamically, at any suitable time during the operation of the system. Applications may assign priorities to their key requests by adding priority entries to the key lists if desired. The application interface may take the contents of such lists into account when deciding how to resolve a conflict between two applications that are requesting use of the same remote control key.

The foregoing is merely illustrative of the principles of this invention and various modifications can be made by those skilled in the art without departing from the scope and spirit of the invention.

What is claimed is:

1. A method for allowing a plurality of applications, each implemented on user equipment and associated with a resource requirement, to assume control of the user equipment, wherein one of the plurality of applications is an interactive program guide, the method comprising:
   receiving, with a control request processor, a control request from a requesting application, wherein the requesting application is one of the plurality of applications;
   comparing a first plurality of buttons associated with an active mode of the requesting application with a second plurality of buttons associated with an active mode of a second application of the plurality of applications;
   determining, with the control request processor and without user input, whether any button in the first plurality of buttons is included in the second plurality of buttons; and transferring control of the user equipment to the requesting application in response to determining that none of the first plurality of buttons is included in the second plurality of buttons.

2. The method of claim 1 further comprising:
determining whether another one of the plurality of applications has primary control of the user equipment.

3. The method of claim 2, wherein determining whether to transfer control of the user equipment to the requesting application comprises:
determining whether to transfer control of the user equipment from the application with primary control to the requesting application based on priorities associated with the requesting application and the application with primary control.

4. The method of claim 2, wherein transferring control of the user equipment to the requesting application comprises:
providing the control request to the application with primary control of the user equipment, wherein the application with primary control relinquishes control of the user equipment in response to receiving the control request.

5. The method of claim 2, wherein the control request is a first control request, the method further comprising:
transferring control of the user equipment from the requesting application to the application with primary control in response to a second control request.

6. The method of claim 5, wherein transferring control of the user equipment from the requesting application to the application with primary control comprises:
providing the second control request to the requesting application, wherein the requesting application relinquishes control of the user equipment in response to receiving the second control request.

7. The method of claim 5, wherein transferring control of the user equipment from the requesting application to the application with primary control comprises:
providing the second control request to the application with primary control of the user equipment, wherein the application with primary control reasserts control of the user equipment in response to receiving the second control request.

8. The method of claim 2, wherein the control request is a request to terminate operation of the application with primary control of the user equipment, and wherein transferring control of the user equipment to the requesting application comprises:
terminating operation of the application with primary control of the user equipment.

9. The method of claim 2, wherein the control request is a request to suspend operation of the application with primary control of the user television equipment, and wherein transferring control of the user equipment to the requesting application comprises:
suspending operation of the application with primary control of the user equipment.

10. The method of claim 1, wherein the control request is tagged with an identifier associated with the requesting application, and wherein transferring control of the user equipment to the requesting application comprises:
identifying the requesting application by comparing the identifier of the control request to a plurality of identifiers included in a registered application list.

11. The system of claim 1, wherein the control request is tagged with an identifier associated with the requesting application, and wherein the control request processor is further configured to:
identify the requesting application by comparing the identifier of the control request to a plurality of identifiers included in a registered application list.

12. The method of claim 10, wherein the registered application list comprises a communications address and an identifier for each registered application.

13. The system of claim 11, wherein the registered application list comprises a communications address and an identifier for each registered application.

14. The method of claim 1, wherein each of the plurality of applications has a unique function.

15. The method of claim 1, wherein the user equipment includes a user television equipment.

16. The method of claim 1, wherein the resource requirement comprises at least one of a database access resource, a graphics library resource, a parental control resource, a scheduling resource, and a tuning resource.

17. The method of claim 1, wherein the resource requirement of the requesting application comprises a plurality of resources, and transferring control of the user equipment to the requesting application comprises:
transferring control of a subset of the plurality of resources to the requesting applications, wherein the subset of the plurality of resources is determined based on the resource requirement of the requesting application.

18. The method of claim 1, wherein another one of the plurality of applications has primary control of the user equipment, and determining whether to transfer control of the user equipment to the requesting application comprises:
retrieving the resource requirement of the requesting application; and
comparing the resource requirement of the requesting application to the resource requirement of the other one of the plurality of applications.

19. A system for allowing a plurality of applications, each implemented on user equipment and associated with a resource requirement, to assume control of the user equipment, wherein one of the plurality of applications is an interactive program guide, the system comprising:
a control request processor configured to:
receive a control request from a requesting application, wherein the requesting application is one of the plurality of applications;
compare a first plurality of buttons associated with an active mode of the requesting application with a second plurality of buttons associated with an active mode of a second application of the plurality of applications;
determine, without user input, whether any button in the first plurality of buttons is included in the second plurality of buttons; and
transfer control of the user equipment to the requesting application in response to determining that none of the first plurality of buttons is included in the second plurality of buttons.

20. The system of claim 19, wherein the control request processor is further configured to:
determine whether another one of the plurality of applications has primary control of the user equipment.

21. The system of claim 20, wherein the control request processor is further configured to:
determine whether to transfer control of the user equipment from the application with primary control to the requesting application based on priorities associated with the requesting application and the application with primary control.

22. The system of claim 20, wherein the control request processor is further configured to:
provide the control request to the application with primary control of the user equipment, wherein the application with primary control relinquishes control of the user equipment in response to receiving the control request.

23. The system of claim 20, wherein the control request is a first control request, and wherein the control request processor is further configured to:
transfer control of the user equipment from the requesting application to the application with primary control in response to a second control request.

24. The system of claim 23, wherein the control request processor is further configured to:
provide the second control request to the requesting application, wherein the requesting application relinquishes control of the user equipment in response to receiving the second control request.

25. The system of claim 23, wherein the control request processor is further configured to:
provide the second control request to the application with primary control of the user equipment, wherein the application with primary control reasserts control of the user equipment in response to receiving the second control request.

26. The system of claim 20, wherein the control request is a request to terminate operation of the application with primary control of the user equipment, and wherein the control request processor is further configured to:
terminate operation of the application with primary control of the user equipment.

27. The system of claim 20, wherein the control request is a request to suspend operation of the application with primary control of the user equipment, and wherein the control request processor is further configured to:
suspend operation of the application with primary control of the user equipment.

28. The system of claim 19, wherein each of the plurality of applications has a unique function.

29. The system of claim 19, wherein the user equipment includes a user television equipment.

30. The system of claim 19, wherein the resource requirement comprises at least one of a database access resource, a graphics library resource, a parental control resource, a scheduling resource, and a tuning resource.

31. The system of claim 19, wherein the resource requirement of the requesting application comprises a plurality of resources, and the control request processor is further configured to:
transfer control of a subset of the plurality of resources to the requesting application, wherein the subset of the plurality of resources is determined based on the resource requirement of the requesting application.

32. The system of claim 19, wherein another one of the plurality of applications has primary control of the user equipment, and the control request processor is further configured to:
retrieve the resource requirement of the requesting application; and
compare the resource requirement of the requesting application to the resource requirement of the other one of the plurality of applications.

* * * * *